April 10, 1956 E. P. DRAKE 2,741,427

CALCULATING MACHINE WITH KEYBOARD INSTRUMENTALITIES FOR BINARY TO DECIMAL CONVERSION

Filed April 29, 1952 5 Sheets-Sheet 1

INVENTOR.
Edward P. Drake
BY
Fred M. Schwend
ATTORNEY.

April 10, 1956 E. P. DRAKE 2,741,427
CALCULATING MACHINE WITH KEYBOARD INSTRUMENTALITIES
FOR BINARY TO DECIMAL CONVERSION
Filed April 29, 1952 5 Sheets-Sheet 2

INVENTOR.
Edward P. Drake
BY
Fred N. Schwend
ATTORNEY.

April 10, 1956 E. P. DRAKE 2,741,427
CALCULATING MACHINE WITH KEYBOARD INSTRUMENTALITIES
FOR BINARY TO DECIMAL CONVERSION
Filed April 29, 1952 5 Sheets-Sheet 3

INVENTOR.
Edward P. Drake
BY
[signature]
ATTORNEY.

April 10, 1956 E. P. DRAKE 2,741,427

CALCULATING MACHINE WITH KEYBOARD INSTRUMENTALITIES
FOR BINARY TO DECIMAL CONVERSION

Filed April 29, 1952 5 Sheets-Sheet 4

INVENTOR.
Edward P. Drake
BY
Fred N. Schwend
ATTORNEY.

April 10, 1956 E. P. DRAKE 2,741,427

CALCULATING MACHINE WITH KEYBOARD INSTRUMENTALITIES FOR BINARY TO DECIMAL CONVERSION

Filed April 29, 1952 5 Sheets-Sheet 5

INVENTOR.
Edward P. Drake

Fred N. Schwend

ATTORNEY

United States Patent Office 2,741,427

Patented Apr. 10, 1956

2,741,427

CALCULATING MACHINE WITH KEYBOARD INSTRUMENTALITIES FOR BINARY TO DECIMAL CONVERSION

Edward P. Drake, Glendale, Calif., assignor to Clary Corporation, a corporation of California Application April 29, 1952, Serial No. 284,936

3 Claims. (Cl. 235—61)

This invention relates to calculating machines, and has particular reference to machines capable of converting amounts designated in one numeral system to corresponding amounts designated in another numeral system.

Many of the so-called electronic computers and counters perform the process of computation by use of a nondecimal numeral system such as the binary system. Such nondecimal systems are often preferred because the characteristics of the computing apparatus are inherently better suited for a particular numeral system. Thus, for example, the numerals in the binary system can be registered by the off or on condition of certain electrical or electronic components, such as relays, electron tubes, etc., thereby registering the only two necessary digits, i. e., "0" and "1" found in a binary number.

However, since the decimal system is more universally used and understood, it is generally desirable to convert a binary number obtained either from such computers, or otherwise, into decimal amounts.

Also, it may be desirable to accumulate or add several such binary numbers which might be successively obtained from a nondecimal computer or from several different computers or counters and to obtain this sum in decimal form. On the other hand, it might be desirable to combine the result obtained from such computers with other factors provided in decimal form in additional computations.

Therefore, it becomes a principal object of the present invention to provide apparatus for converting values designated in one numeral system to corresponding values designated in another numeral system.

Another object is to convert values designated in a binary form to the equivalent values in a decimal form.

A further object is to provide apparatus for converting values in a binary form to corresponding values in a decimal form and simultaneously adding or subtracting such values.

A further object is to provide apparatus of the foregoing type including a plurality of electromagnetic devices and means for insuring proper operation of such devices.

The manner in which the above and other objects of the invention are accomplished will be readily understood on reference to the following specification when read in conjunction with the accompanying drawings wherein.

*Computing machine—General*

Figure 1:
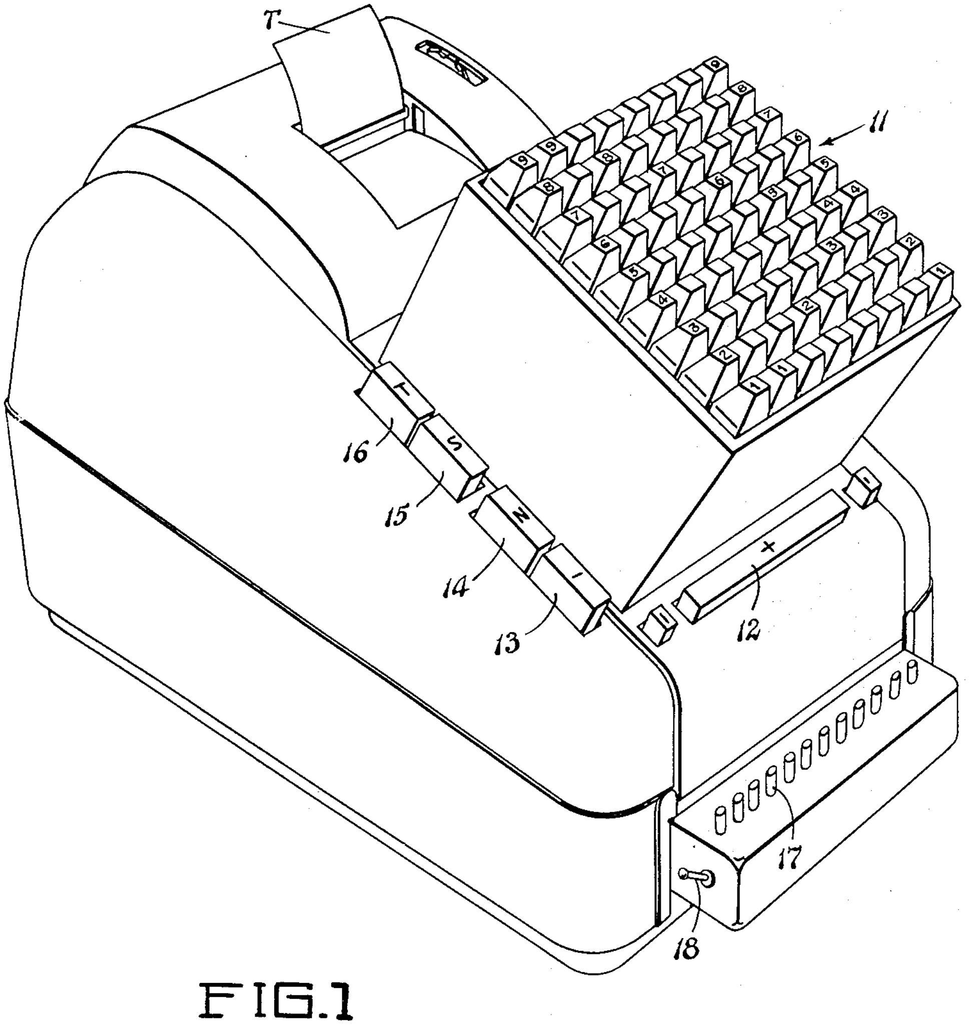
Fig. 1 is a perspective view of a computing machine embodying the present invention.

The computing machine is basically similar to that found in the well known Clary adding machine which is disclosed and claimed in the patent to R. E. Boyden, No. 2,583,810, issued on January 29, 1952. The particular accumulating mechanism incorporated in the machine is disclosed in the patent to E. P. Drake, No. 2,472,696, issued on June 7, 1949.

Since the basic structure of the machine is found in the commercially available Clary adding machine and is disclosed in the above patents, only those portions thereof which relate directly to the present invention will be disclosed in detail and reference may be had to the foregoing patents for a disclosure of the complete machine, including mechanisms not specifically disclosed herein. However, it is to be understood that the invention is not limited to the particular basic machine disclosed.

The machine includes a series of orders or banks of amount keys 11 on which amounts to be entered into the machine may be set, each bank including nine keys ranging in value from "1" to "9." In addition, a series of depressible control bars are provided, including an add bar 12, subtract bar 13, nonadd bar 14, subtotal bar 15 and total bar 16. The latter bars are each effective, upon depression thereof, to cause operation of the machine to perform a respective function controlled by the selected bar. Also, as will be noted hereinafter, each of the amount keys, as well as the add and subtract bars 12 and 13, are provided with solenoids located in different circuits controlled by various ones of a set of "binary" keys 17. Depression of a selected binary key will effect energization of one or more predetermined amount key solenoids and one or the other of the solenoids associated with the add and subtract bars, depending upon the setting of a single pole, double throw switch 18, whereby to additively or subtractively enter into the machine in decimal form a value corresponding to an equivalent binary amount set up on the binary keys 17.

*Keyboard*

The keyboard 11 is of the flexible type and each amount key 11, when depressed, serves as a stop to limit the movement of an aligned drive rack 20 (Fig. 2) which is effective to drive an accumulator, generally indicated at 21, and to set a printing mechanism, generally indicated at 22, to print the values set up on the keys.

Each of the keys 11 comprises a key top 23 of plastic or the like mounted on a key stem 24 which is guided in aligned slots formed in a pair of spaced key plates 25 and 26, the latter being rigidly mounted on the frame of the machine in a manner not shown.

Key stems 24 rest on caps 27 of nonferrous metal which are secured to the tops of solenoid armatures 28, the latter being of a ferrous metal and slidable in the cores of respective solenoids 30. The solenoids 30 are suitably secured to a supporting plate 31 which in turn is suitably secured, in a manner not shown, to the machine frame.

Plungers 32 of nonferrous material are interposed between the various solenoid armatures 28 and sub key stems 33. The latter are guided in aligned slots formed in key support plates 34 and 35, also suitably secured, in a manner not shown, to the machine frame.

Figure 2:
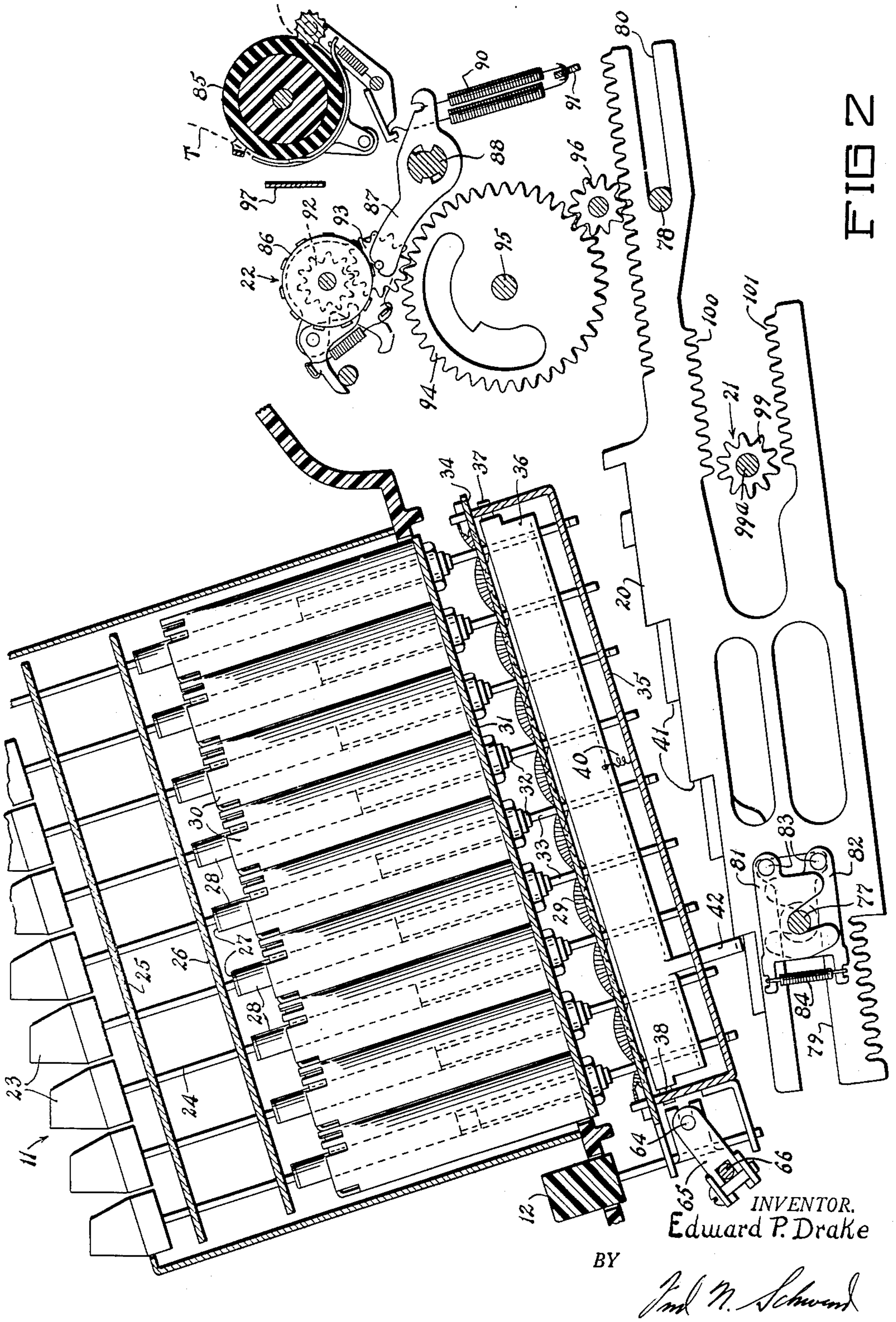
Fig. 2 is a general longitudinal view through the computing machine illustrating the keyboard, racks, accumulator, and printer instrumentalities.

Spring means are provided to individually urge the various sub key stems 33, and consequently the armatures 28 and keys 23, into their raised positions illustrated in Fig. 2.

For this purpose a tension spring 29 is extended along each bank of sub key stems 33, being attached at opposite ends to the plate 34 and passing through suitable openings in the stems 33. The spring 29 passes through openings (not shown) in the plate 34 and is supported by suitable cross ribs extending under the spring intermediate adjacent ones of the key stems.

For the purpose of maintaining depressed ones of the keys 33 in depressed condition, each sub key stem 33 is provided with a suitable cam lobe 170 (Fig. 7) which, when the key is depressed, rocks a locking bail 36, located in the same bank, outwardly, the latter being pivotally supported at opposite ends thereof by trunnion bearings 37 and 38. A spring 40 tensioned between the locking bail 36 and a suitable part of the key plate 35 urges the locking bail against the side edges of the various key stems in the associated bank. At the end of a key stroke, the cam lobe on the key stem 33 passes below the bail 36, enabling the latter to partially retract to a position where it latches the depressed key stem in the path of an associated shoulder 41 on the aligned rack 20.

The various shoulders 41 are so spaced relative to the associated sub key stems 33 that the aligned rack will eventually advance a number of increments equal to the value of the depressed key before being arrested thereby. Although no such shoulder is provided for limiting against the "9" key stem 33, depression of the latter will enable its associated rack 20 to advance to its fullest extent, or nine increments.

A zero block 42 is formed on each locking bail 36, and when no key 23 in that order is depressed, the bail of that order will be spring held in an extreme inwardly rocked position where the zero block will be located directly in front of one of the rack shoulders 41, thereby preventing any substantial movement of the rack during subsequent operation of the machine. However, when any amount key is depressed, the associated locking bail will be rocked outward thereby sufficiently to retain the zero block 42 out of the path of the aligned rack, permitting the latter to advance until arrested by the stem of the depressed key, or to its fullest extent as in he case of depression of the "9" key.

*Machine drive instrumentalities and controls therefor*

Figures 3, 4:
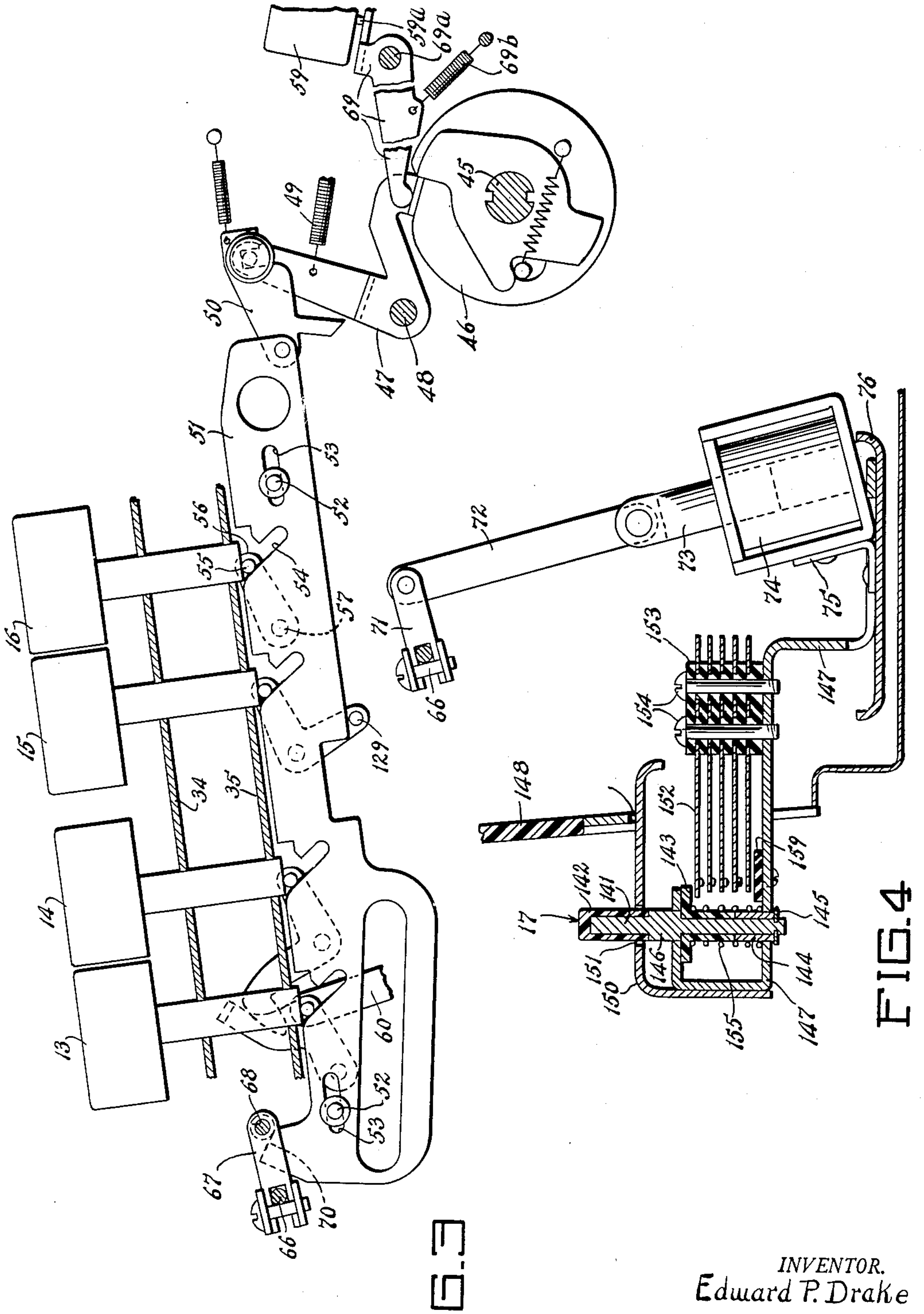
Fig. 3 is a sectional elevational view illustrating the clutch and motor controls.
Fig. 4 is a sectional elevational view through the fore part of the machine, illustrating one of the binary keys and switch contacts controlled thereby.

Referring in particular to Fig. 3, the machine driven by a main drive shaft 45, through a cyclic clutch generally indicated at 46, from a suitable electric motor (not shown). The clutch is controlled by a clutch dog 47 pivotally supported on the frame pin 48 and urged by a tension spring 49 into its illustrated position relative to the clutch wherein it maintains the latter in disengaged position. Means are provided whereby depression of any of the various machine control bars either manually or under control of the converter circuitry to be described hereinafter, will cause engagement of the main clutch 46 and operation of the machine. For this purpose the clutch dog 47 is connected by a coupling member 50 to a clutch control bar 51. The latter is slidably supported for fore and aft movement by frame studs 52 embraced by guide slots 53 formed in the control bar.

Figures 5, 7, 8:
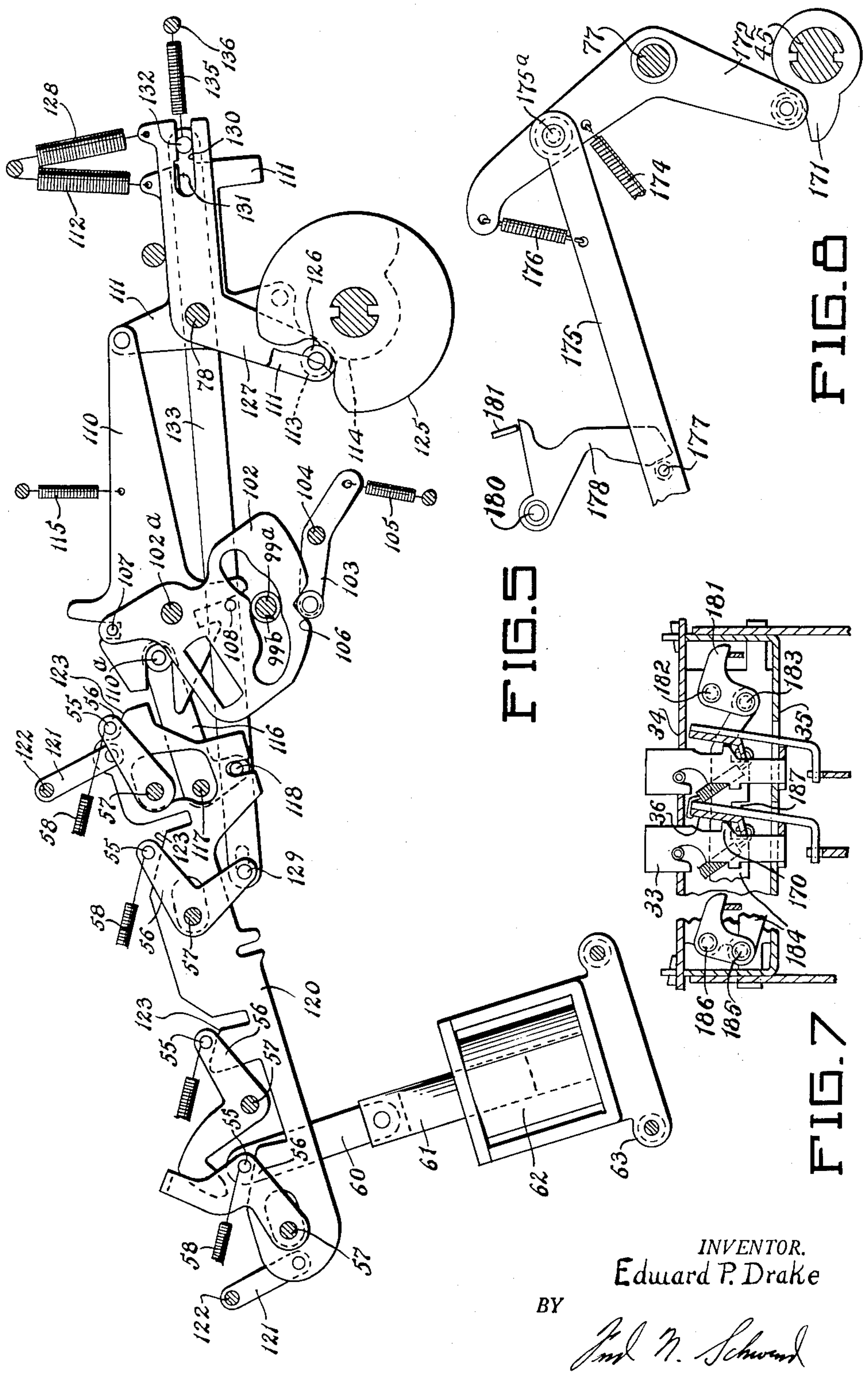
Fig. 5 is a sectional elevational view illustrating the accumulator positioning controls.
Fig. 7 is a transverse sectional view of the keyboard with parts broken away.
Fig. 8 is a side view of the key release mechanism.

Cam slots 54 are formed on the cam bar 51 and each underlies a pin 55 carried by an arm 56 which is pivoted on a frame pin 57. The various pins 55 underlie the key stems of respective ones of machine control bars 13 to 16, inclusive. The arms 56 are normally held in their illustrated positions whereby to maintain the associated control bars in their raised positions by individual tension springs 58 (Fig. 5). Thus, depression of any of the control bars will cause its pin 55 to cam the bar 51 (forwardly, to the left of Fig. 3) to cause engagement of the clutch.

Means are provided under control of the clutch dog 47 to effect operation of the electric drive motor. A motor control switch 59, having its switch contacts (not shown) located in the power circuit of the motor, is suitably secured to the machine frame. An actuating plunger 59*a* of the switch overlies one end of a switch control lever 69, pivoted at 69*a* and urged counterclockwise by a spring 69*b* into engagement with an ear on the clutch dog 47, thereby normally holding the switch 59 open. However, when the clutch dog is rocked to effect engagement of the clutch, the lever 69 is rocked clockwise, enabling the switch to close.

Means are provided for effecting automatic depression of the subtract bar 13 in response to closing of an electrical control circuit by one of the binary keys 17, and for this purpose the arm 56 associated with the subtract bar is connected by a link 60 (Fig. 5) to the armature 61 of a subtract entry control solenoid 62, the latter being suitably supported by the machine framework through a bracket 63.

The add bar 12 (Figs. 1 and 2) is also effective upon depression thereof to cause engagement of the main clutch 46, and for this purpose the stem of the add bar is coupled through a pin and slot connection 64 to an arm 65 secured on a rock shaft 66, the latter being suitably journaled in bearings (not shown) formed in the machine framework. A second arm 67 (Fig. 3) is also secured to the rock shaft 66 and carries a roller 68 engageable with an inclined camming surface 70 formed on the forward portion of the clutch control bar 51. Thus, depression of the add bar will rock the shaft 66 and, through arm 67, will cam the clutch control bar 51 forwardly to effect engagement of the clutch.

Means are provided for automatically depressing the add bar in response to completion of an add control circuit, to be described hereinafter, upon depression of various ones of the binary keys 17. For this purpose, a third arm 71 (Fig. 4) is attached to the rock shaft 66, the latter arm being connected by link 72 to the armature 73 of an add entry control solenoid 74. The solenoid 74 is securely mounted on the frame of the machine through a bracket 75 which is suitably secured to a cross brace 76 forming part of the machine framework.

Means (not shown) are provided for yieldably transmitting a drive from the drive shaft 45 to the various drive racks 20 so as to yieldably advance the latter, during the first 180° of a machine cycle, until arrested by depressed ones of the key stems 33 in those orders where a key has been depressed, and to return the racks during the last 180° of the cycle.

The racks 20 are guided for fore and aft movement by shafts 77 and 78 embraced by slots 79 and 80, respectively, formed in each rack. The shaft 77 is suitably advanced sideways, fore and aft of the machine, by the drive shaft 45 in a manner not shown, once during each machine cycle, while the shaft 78 is held stationary.

The shaft 77 is yieldably connected to the various racks by pairs of opposed driving elements 81 and 82 pivotally supported on the shaft 77 and having rollers 83 thereon which normally engage lateral depressions formed at the closed ends of the rack slots 79. A spring 84 extending between the elements 81 and 82 of each pair, urges the latter to normally hold the rollers 83 in the depressions in slot 79 until the respective rack is arrested by the zero block 42 or by a depressed one of the sub key stems 33.

The various values registered on the rack 20 during item entering or totalling operations are printed on a paper tape T by the printing mechanism 22 as the latter is passed around a platen 85 to a printing point at which the values are printed thereon.

*Printing mechanism*

The printer 22 comprises a series of numeral type printing wheels 86, each associated with a respective one of the racks 20. Each printing wheel has thereon a series of type ranging from "0" to "9" and these wheels are so connected to their associated racks that they will each print a digit corresponding to the value of a key depressed in the associated bank or corresponding to the numerical position to which the associated rack is moved during its forward advancement.

Each type wheel is rotatably mounted on a separate lever 87 which is loosely keyed on a printer control shaft 88 and is urged clockwise by a tension spring 90 extending between the lever and a machine frame part 91.

A gear 92, fixed to each type wheel, is permanently meshed with a gear 93, also rotatably mounted on the associated printer lever 87. Except during printing operations, the levers 87 are held in their positions illustrated in Fig. 2 by the shaft 88, thereby maintaining the various gears 93 in mesh with aligned ones of a series of idler gears 94, all mounted for independent rotation on a stationary cross shaft 95. The various idler gears 94 are entrained with respective ones of the drive racks 20 through individual pinion assemblies, one of which is shown at 96.

During the printing phase of a machine cycle, at which time the racks 20 are maintained in advanced positions limited by depressed ones of the key stems 33 or by the zero block 42, the printer control shaft 88 is rocked clockwise, permitting the various springs 90 to rock the levers 87 clockwise and thus carry the printing wheel forwardly into contact with a printing ribbon 97 to thereby print the amount registered on the type wheels 86 onto the tape T.

*Accumulator positioning controls*

In order to effect additive or subtractive entries into the accumulator 21 (Fig. 2), the latter is raised or lowered to mesh ordinarily arranged accumlator gears 99 comprising the accumulator, with upper or lower rack gear sections 100 or 101, respectively during a machine cycle. For this purpose, the mechanism illustrated in Fig. 5 is provided under control of different ones of the control bars 12–16, inclusive (Figs. 1, 2 and 3).

The accumulator includes an accumulator gear supporting shaft **99*a* provides with rollers on opposite ends thereof, one of which is shown at 99*b*, the latter embraced by a cam groove formed in a cam 102 pivoted at 102*a***.

Cam 102 is normally held in its illustrated neutral position by a centralizer lever 103, pivoted at 104, and spring urged in a clockwise direction by a spring 105 to maintain a roller thereon in a centralizing notch 106 formed on the lower edge of the cam.

A pair of pins 107 and 108 are mounted on the cam on opposite sides of the pivot **102*a*. These pins are adapted to be selectively embraced by a hook 110 pivotally connected to a three-armed cam follower 111. The cam follower is pivoted on the aforementioned shaft 78 and is urged in a counterclockwise direction by a spring 112 to press a roller 113 thereon against a cam 114 fastened to the drive shaft 45**.

The hook 110 is normally held in its upper illustrated position in coupling engagement with the pin 107 by a light tension spring 115 extending between the hook and a suitable frame stud. In this normal condition, which is effective during add entry operations, rearward movement of the hook upon operation of the machine will rock the cam 102 clockwise and thereby raise the accumulator into mesh with the upper rack gear sections 100.

Means under control of the bars 13 to 16 are provided for locating the hook 110 in a lower position in coupling engagement with the pin 108 or in an intermediate position out of coupling engagement with either of the pins 107 or 108. For this purpose, the hook is coupled through a pin and slot connection **110*a* to a bell crank 116 pivoted at 117 and in turn connected through a pin and slot arrangement 118 to an accumulator positioning control bar 120. The latter is suspended for fore and aft movement by swinging links 121 suspended from frame pins 122**.

The control bar 120 is provided with camming surfaces 123 underlying the four pins 55 associated with the control bars 13 to 16 (see also Fig. 3). The camming surfaces 123 are so formed that upon depression of the subtract bar 13, subtotal bar 15 or total bar 16, the respective pins 55 will cam the control bar 120 forwardly to its fullest extent to cause the bell crank 116 to lower the hook 110 to engage the pin 108 so that eventual rearward movement of the hook will rock the cam 102 counterclockwise to lower the accumulator into mesh with the lower rack gear sections 101 and thus effect subtractive or totalling operations. The camming surface 123 on bar 120 associated with the pin 55 underlying the non-add bar 14 is so formed that depression of the latter bar will set the hook member 110 in an intermediate position, whereupon the accumulator will remain in its neutral position during rearward movement of the hook 110.

It will be noted that the cam 114 has a high portion extending over approximately one-half of its periphery, and therefore during adding, subtracting and totalling operations, and after the high portion of the cam has passed the cam follower roller 113, the hook 110 will be returned forwardly, thereby demeshing the accumulator from the racks before return of the latter to their home positions, i. e., to the right in Fig. 2, during the second 180° of a machine cycle. However, in subtotalling operations, the accumulator must be held in mesh with the racks during both the advance and return movements thereof in order to reset the accumulator to its former value after the subtotal amount has been obtained and printed. Therefore, it is necessary, in subtotalling, to maintain the accumulator in mesh with the drive racks throughout the major portion of the machine cycle, and for this purpose a second cam 125 is keyed on the shaft 45 directly adjacent the cam 114. The cam 125 is provided with a high portion extending around the major portion of its periphery, and is engaged by a roller 126 carried by a cam follower 127, also pivoted on the shaft 78 and urged counterclockwise by a spring 128.

It will be noted that the cam follower 127 extends rearwardly to a greater extent than the cam follower 111, and both cam followers are provided with normally aligned slots 130 and 131, respectively. A pin 132 rides in one or both of these slots and is carried by a link 133 pivoted to a depending portion of the arm 56 associated with a subtotal bar through a pin and slot connection 129. A spring 135, tensioned between the pin 132 and a frame stud 136, normally holds the pin in a position engaging the slot 130 only. However, upon depression of the subtotal bar, its arm 56 will be rocked clockwise, drawing the link 133 forwardly to position the pin 132 in engagement with both slots 130 and 131. Thus, during the subsequent subtotalling operation the two cam followers 111 and 127 will be locked together by the pin 132 and will thus move as a unit under control of the cam 125 to hold the accumulator engaged with the drive racks during both the forward and return movement thereof.

Suitable zero stops (not shown) are provided under control of the total and subtotal bars to arrest the accumulator gears in their zero registering positions during totalling and subtotalling operations as is well understood in the art.

*Key release control*

In addition and subtraction operations the amount keys are automatically released from set positions near the end of each machine cycle. For this purpose, a cam 171 (Fig. 8) is keyed on the drive shaft 45 and is effective toward the end of the cycle to rock a cam follower 172 clockwise about support shaft 77 and against the action of a spring 174 tensioned between the cam follower and part of the machine frame (not shown). A link 175 is pivotally connected at **175*a* to the cam follower 172 and is normally held in its illustrated position relative to the cam follower by a tension spring 176 to position a pin 177 thereon in front of a depending arm of the bell crank 178. The latter is pivotally supported at 180 and underlies bell crank 181 (see also Fig. 7). The latter is pivoted at 182 to the rear wall of the key support plate 35 and is pivotally connected at 183 to one end of a key release bar 184**. The latter is suspended at its opposite end by a link 185 pivoted at 186, permitting lengthwise movement of the key release bar.

The bar 184 has a plurality of notches 187 therein, each embracing a rearward extension of a respective one of the locking bails 36. Thus, toward the end of each machine cycle, the cam 171 is effective to actuate the linkage including parts 172, 175, 178, 181 and 184 to rock the various locking bails 36 and thus release all set amount keys.

*Binary-to-decimal converter circuit*

Figure 6:
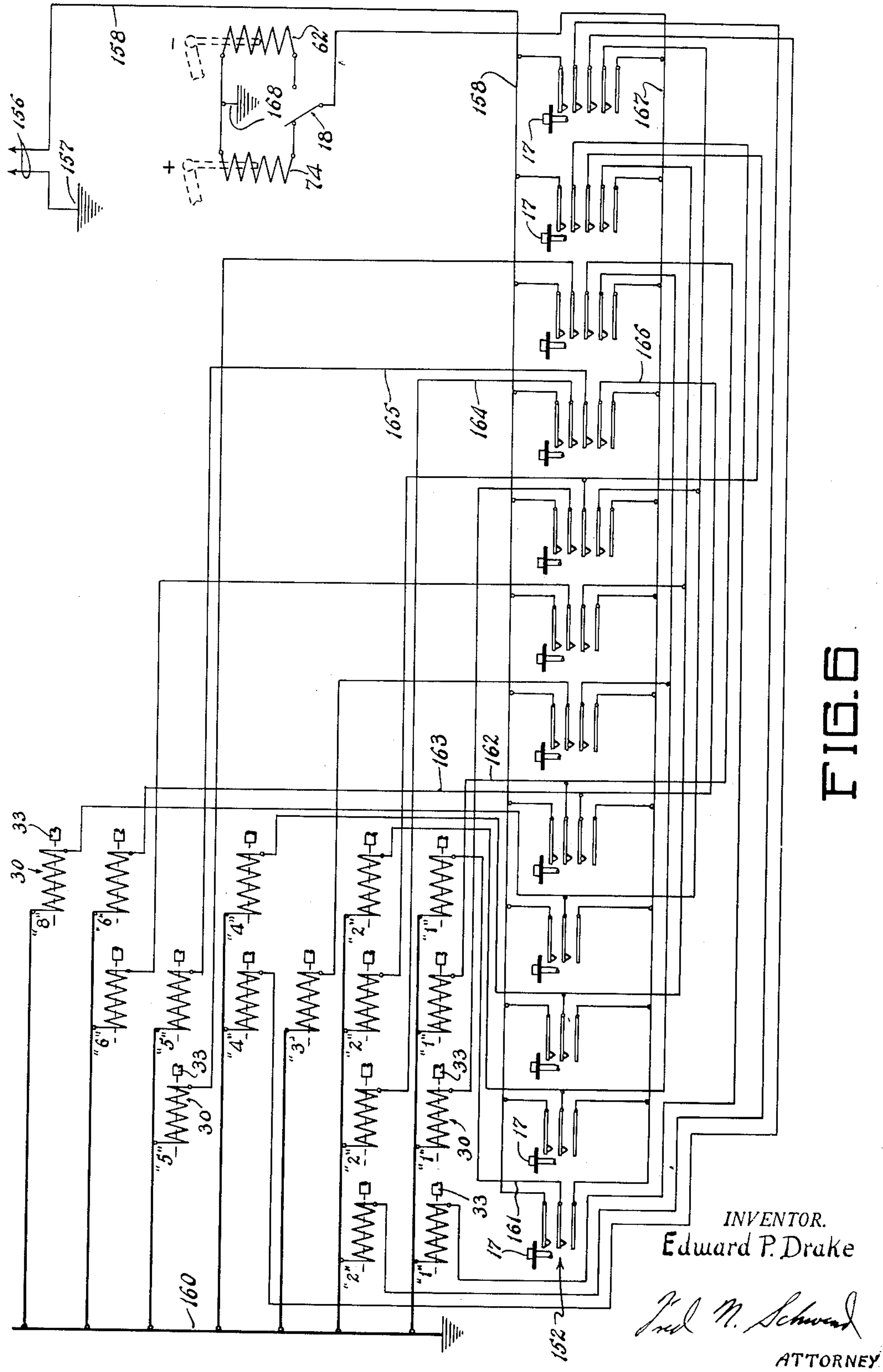
Fig. 6 is a circuit diagram illustrating the binary-to-decimal conversion and the machine control circuits.

As noted hereinbefore, binary amounts are entered into the machine by means of the binary keys 17 (Figs. 1, 4 and 6), these keys ranging in value, beginning at the left in Figs. 1 and 6, according to the binary progression of values, or according to the powers of 2. For example, the left-most binary key represents the lowest power of 2, i. e., $2^0$ or "1" and when depressed effects entry of the decimal amount "1" in the machine; the next binary key represents $2^1$ or "2" and effects entry of the decimal amount "2" in the machine; the third key represents $2^2$ or "4" and effects entry of the amount "4." This progression continues according to the following table:

| Position of binary key (progressing from the left): | Equivalent decimal value |
|---|---|
| 1 | 1 |
| 2 | 2 |
| 3 | 4 |
| 4 | 8 |
| 5 | 16 |
| 6 | 32 |
| 7 | 64 |
| 8 | 128 |
| 9 | 256 |
| 10 | 512 |
| 11 | 1024 |
| 12 | 2048 |

As shown in Fig. 4, each of the various keys 17 comprises a cylindrical metal key stem 141 having a key top 142 of plastic or the like. A flanged bushing 143 formed of a suitable di-electric material is mounted on a small diameter section formed on the lower end of the key stem. The latter bushing is retained in place by a metal bushing 144 which, in turn, is held by a clip 145 attached to the lower end of the key stem. The intermediate portion 146 of the key stem and the lower bushing 144 are slidably mounted in bearings formed in bent-over sections of a bracket member 147. The latter is suitably secured to the aforementioned cross brace 76 and extends forwardly, through an opening 149 in the machine casing 148. A cover 150 is removably mounted, in a manner not shown, on the bracket member 147 and is provided with openings 151 through which the various key tops 142 extend.

Each of the binary keys 17 is arranged to close a group of leaf contact springs 152 upon depression thereof. The number of leaf contact springs associated with the various keys differ as will appear presently. However, each group comprises a series of anchor blocks 153 of di-electric material, between which extend the fixed ends of the various leaf springs 152. A pair of clamp screws 154 are passed through openings in the various blocks 153, out of electrical contact with the springs 152, and are threaded into the bracket member 147 to clamp the fixed ends of the contact springs.

Each key 17 is normally held in its upper position illustrated in Fig. 4 by a compression spring 155 surrounding the bushings 143 and 144, and in this condition the free ends of the various leaf springs are held out of contact with each other. It will be noted that a strip 159 of di-electric material is secured to the bracket 147 directly below the free end of the lower contact spring of each group to prevent electrical contact between the spring and the frame of the machine.

The various groups of contacts 152 are connected in circuit with certain of the amount key solenoids 30 in accordance with the equivalent decimal values of the various binary keys 17 so that a decimal amount will be set up on the keyboard in accordance with the decimal value of the particular binary key 17 which is depressed. Also, each group of contacts 152 is arranged to complete a circuit through one or the other of the add and subtract control solenoids 62 and 74, respectively (Figs. 4, 5 and 6), depending upon the setting of the single pole double throw switch 18 (Figs. 1 and 6).

Referring in particular to Fig. 6, power for operating the machine and for selectively setting the various amount keys 11 upon depression of different ones of the binary keys 17 is obtained from a power circuit 156, one side of which is grounded at 157 to the metal frame of the machine, while the other side thereof is connected by a line 158 to the upper one of each of the various groups of contact springs 152.

The various amount key solenoids 30 are each connected at one end thereof to a ground line 160 grounded to the machine frame, and the other end of each solenoid is connected to one or more of various contact springs 152 located in different ones of the contact groups in accordance with the decimal value of the different keys 17. For example, the left-most binary key has its second contact (from the top) connected by line 161 to the "1" amount key solenoid 30 in the units bank; the fifth binary key (from the left) has its second contact (from the top) connected by line 162 to the "1" key solenoid in the tens bank, and its third contact connected by line 163 to the "6" key solenoid in the units bank; the ninth binary key has its second contact connected by line 164 to the "2" key solenoid in the hundreds bank, its third contact connected by line 165 to the "5" key solenoid in the tens bank, and its fourth contact connected by line 166 to line 163 which is connected to the "6" key solenoid in the units bank.

The lower ones of the various groups of spring contacts are all connected in parallel over a line 167 to the movable blade of switch 18, and each is thus effective upon depression of its associated binary key to complete a circuit through one or the other of the machine control solenoids 62 and 74, depending upon the setting of the switch 18. It will be noted that the upper ends of the latter solenoids are grounded to the machine frame by ground line 168.

Due to the particular arrangement of the various groups of contact springs, and the fact that one side of the power line 156 is connected to each upper spring contact, it will be noted that the circuits through the various amount key solenoids controlled by any one of the keys 17 will be closed in seriatim. Thus, the upper contact, connected to the ungrounded side of the power circuit 156, will be sequentially connected to one or more amount key solenoids controlled by the particular binary key being depressed. This sequencing of the amount key solenoid circuits will reduce to a minimum any instantaneous loading of the power circuit, and will thereby tend to insure that adequate power is applied to each key solenoid when placed in the power circuit.

It will also be noted that since the operating solenoid circuit including line 167 and a selected one of solenoids 62 and 74 is connected to the lowermost contact of each group, energization of the various key solenoid circuits may be insured before initiation of operation of the machine by one or the other of the machine control solenoids 62 and 74.

*Operation*

In order to more completely understand the functioning of the machine and the manner of operating the same, it may be well to briefly describe the operation thereof in connection with an actual problem to be performed thereby. For example, two binary numbers, i. e., 10111011 and 11100011 are given and it is desired to obtain the decimal amount corresponding to the sum of such binary amounts.

In order to set the machine for an adding operation, the switch 18 is thrown to the position shown in Fig. 6 to place the add control solenoid 74 in circuit with the lower contacts of the various contact groups. In entering the binary number 10111011 and considering the values of such binary amounts to increase progressively from left to right, the first, third, fourth, fifth, seventh and eighth binary keys 17, counting from the left, will be successively depressed to successively enter into the machine the decimal values 1, 4, 8, 16, 64 and 128, leaving the sum of 221. Thereafter, in entering the second binary number 11100011, the first, second, third, seventh and eighth binary keys will be depressed to successively enter the decimal values 1, 2, 4, 64 and 128, or a total of 199.

The sum of such amounts, i. e., 420, would thus be found in the accumulator, and upon depression of the total or subtotal bars 15 and 16, a totalling or subtotalling operation would ensue to record the amount on the tape 84.

If binary amounts are to be added to or subtracted from amounts already in decimal form, the decimal amount would be entered directly in the keyboard 23 and the add bar 12 depressed, the switch 18 would then be set accordingly, and the binary amount entered as noted above.

Obviously, if it is desired to enter the lowermost binary digits from the right of the binary keyboard, the connections to the various groups of contact springs would be reversed from that shown in Fig. 6.

Also, it will be apparent that the circuit connections between the various keys 17 and the various amount key solenoids 30 can be modified to convert other forms of nondecimal numeral systems to the decimal system and simultaneously additively or subtractively enter the same in the machine.

Having thus described the invention, what I desire to secure by United States Letters Patent is:

1. In a computing machine, the combination comprising means including an electric motor for operating said machine, an accumulator, differential actuators for said accumulator, decimally arranged selectively operable electromagnetic devices for differentially controlling said actuators, means comprising a plurality of normally open switches connected in circuit with respective ones of said electromagnetic devices for energizing said devices, said switches being arranged in groups according to the numerical progression of values found in a nondecimal system, a control circuit for said motor comprising normally open switches in respective ones of said groups, each of said last-mentioned switches being effective upon closing thereof to complete said control circuit, a plurality of selectively depressible keys, and means operable by each of said keys upon depression thereof for successively closing the switches in a respective one of said groups.

2. In a computing machine, the combination comprising means including an electric motor for operating said machine, a decimal accumulator, differential actuators for said accumulator, decimally arranged selectively settable keys for controlling said actuators, electromagnetic devices adapted to set said keys, means including a plurality of normally open switches connected in circuit with respective ones of said devices for energizing said devices, said switches being arranged in groups according to the binary progression of 1, 2, 4, 8, 16, etc., a control circuit for said motor comprising normally open switches in respective ones of said groups, each of said last-mentioned switches being effective upon closure thereof to complete said control circuit, a plurality of depressible binary keys, means operable by each of said binary keys upon depression thereof for closing the switches in a respective one of said groups, said switches in each of said groups being arranged to be closed in seriatim by its respective binary key, spring means for returning said binary keys from depressed position, and means operable by said machine for subsequently releasing said decimally arranged keys from set condition.

3. In a computing machine, the combination comprising means including a motor for operating said machine, a decimal accumulator, differential actuators for said accumulator, means including a first electromagnetic element operable to cause operation of said motor and to condition said accumulator to be actuated by said actuators to accumulate additively, said last-mentioned means including a second electromagnetic element operable to cause operation of said motor and to condition said accumulator to be actuated by said actuators to accumulate subtractively, decimally arranged selectively settable devices for controlling said actuators, electromagnetic devices adapted to set said settable devices, means including a plurality of normally open switches connected in circuit with respective ones of said electromagnetic devices for energizing the same, said switches being arranged in groups according to the binary progression of 1, 2, 4, 8, 16, etc., a control circuit including normally open switches in respective ones of said groups, means for selectively connecting said control circuit to one or the other of said electromagnetic elements, each of said last-mentioned switches being effective upon closure thereof to complete said control circuit, a plurality of depressible binary keys, means operable by each of said binary keys upon depression thereof for closing the switches in a respective one of said groups, said switches in each of said groups being arranged to be closed in seriatim by its respective binary key, and means operable by said machine for releasing said settable devices from set conditon subsequent to actuation of said accumulators by said actuators.

References Cited in the file of this patent

UNITED STATES PATENTS

| | | |
|---|---|---|
| 1,827,836 | Boutet | Oct. 20, 1931 |
| 2,318,591 | Couffignal | May 11, 1943 |
| 2,469,754 | Tierney | May 10, 1949 |
| 2,552,789 | Hopkins | May 15, 1951 |